United States Patent [19]

Tanaka et al.

[11] Patent Number: 4,605,244
[45] Date of Patent: Aug. 12, 1986

[54] VEHICLE SUSPENSION APPARATUS

[75] Inventors: Tadao Tanaka, Okazaki; Sunao Chikamori, Nagoya; Mitsuhiko Harara, Okazaki; Yasutaka Taniguchi; Masanaga Suzumura, both of Nagoya; Minoru Tatemoto, Okazaki; Naotake Kumagai, Aichi; Hiroki Abe; Shozo Takizawa, both of Okazaki, all of Japan

[73] Assignee: Mitsubishi Jidosha Kogyo Kabushiki Kaisha, Tokyo, Japan

[21] Appl. No.: 727,370

[22] Filed: Apr. 25, 1985

[30] Foreign Application Priority Data

Apr. 28, 1984 [JP] Japan .................. 59-63111

[51] Int. Cl.⁴ .............................................. B60G 11/26
[52] U.S. Cl. .............................. 280/707; 280/DIG. 1
[58] Field of Search ................. 280/707, DIG. 1, 714, 280/6 H, 6 R

[56] References Cited

U.S. PATENT DOCUMENTS

| | | | |
|---|---|---|---|
| 2,247,749 | 7/1941 | De Venel | 280/707 |
| 3,321,210 | 5/1967 | Delchev | 280/707 |
| 3,608,925 | 9/1971 | Murphy | 280/707 |
| 4,555,126 | 11/1985 | Ishimitsu et al. | 280/707 |
| 4,566,718 | 1/1986 | Kanai et al. | 280/707 |

FOREIGN PATENT DOCUMENTS

| | | |
|---|---|---|
| EP0001009 | 7/1979 | European Pat. Off. |
| EP0106697 | 4/1984 | European Pat. Off. |
| EP0119564 | 9/1984 | European Pat. Off. |
| 53-26021 | 10/1978 | Japan |
| 59-63216 | 4/1984 | Japan |
| 1335758 | 10/1973 | United Kingdom |
| 2039834 | 8/1980 | United Kingdom |
| 2148217 | 5/1985 | United Kingdom |

Primary Examiner—John J. Love
Assistant Examiner—Kenneth R. Rice
Attorney, Agent, or Firm—Frishauf, Holtz, Goodman & Woodward

[57] ABSTRACT

A vehicle suspension apparatus including suspension units each provided for each wheel and having an air spring chamber is disclosed. When steering wheel is quickly returned toward the center position at the time of a slalom running, it is detected from the steering angular velocity and vehicle velocity that the vehicle body has begun to be returned to a neutral state, and communication control valves are opened before the reaching of the center position, i.e., before the steering angle reaches an insensitive range. Rolling control thus can be improved without delay in the restoration of the position of the vehicle body even at the time of a high speed slalom running, at which time the steering wheel is repeatedly operated quickly.

6 Claims, 11 Drawing Figures

VEHICLE SUSPENSION APPARATUS

BACKGROUND OF THE INVENTION

This invention relates to a vehicle suspension apparatus which can suppress rolling displacement of the vehicle body at the time when the vehicle is making a turn.

A vehicle suspension apparatus has recently been in use, which can provide improved comfortability and steering stability through control of the spring force of a fluid spring or attenuating force of a shock absorber provided in a suspension unit for each wheel according to the vehicle running conditions. It has been desired, however, that the rolling displacement of the vehicle body occurring when making a turn be reduced more effective by such a suspension apparatus.

SUMMARY OF THE INVENTION

An object of the invention is to provide a vehicle suspension apparatus, which can improve the stability of the state of the vehicle without delay in the restoration of a neutral state of the vehicle at the time of a high speed slalom running, at which time the steering wheel is repeatedly operated quickly.

According to the invention, there is provided a vehicle suspension apparatus comprising suspension units each provided for each wheel and having a fluid spring chamber, fluid supply means for supplying fluid to the fluid spring chambers of the suspension units through a fluid supply control on-off valve, fluid exhausting means for exhausting fluid from the fluid spring chambers of the suspension units through an exhaust control on-off valve, and communicating means for communicating the fluid spring chambers of the front left and right suspension units with one another and communicating the fluid spring chambers of the rear left and right suspension units with one another through respective communication control valves, the communication control valves of the communicating means being normally held open to communicate the fluid spring chambers of the front left and right suspension units with one another and communicate the fluid spring chambers of the rear left and right suspension units with one another, a rolling displacement of the vehicle body being suppressed with the communication control valves of the communicating means closed and with fluid supplied to contraction side fluid spring chambers and exhausted from elongation side fluid spring chambers with respect to the direction of rolling of the vehicle body, which vehicle suspension apparatus further comprises steering state detecting means for detecting the steering state of the vehicle, vehicle velocity sensing means for sensing the vehicle velocity, rolling suspension starting means functioning, when it is decided from the steering angular speed detected by the steering state detecting means and the vehicle velocity detected by the vehicle velocity sensing means that it is necessary to start a rolling control, to close the communication control valves of the communicating means and also effect on-off control of the communication control valves, fluid supply control on-off valve and exhaust control on-off valve such as to supply fluid to the contraction side fluid spring chambers and exhaust fluid from the elongation side fluid spring chambers with respect to the direction of rolling of the vehicle body, and rolling control restoring means for opening the communication control valves when it is decided by the steering state detecting means that the steering is being executed in a returning direction toward a center position after the start of the rolling control caused by the rolling suppression starting means and also it is decided from the steering angular speed detected by the steering state detecting means and the vehicle velocity detected by the vehicle velocity sensing means that the vehicle body has begun to return to a neutral state.

DETAILED DESCRIPTION OF THE PREFERRED EMBODIMENT

An embodiment of the invention will now be described in detail with reference to the drawings.

Figure 1:
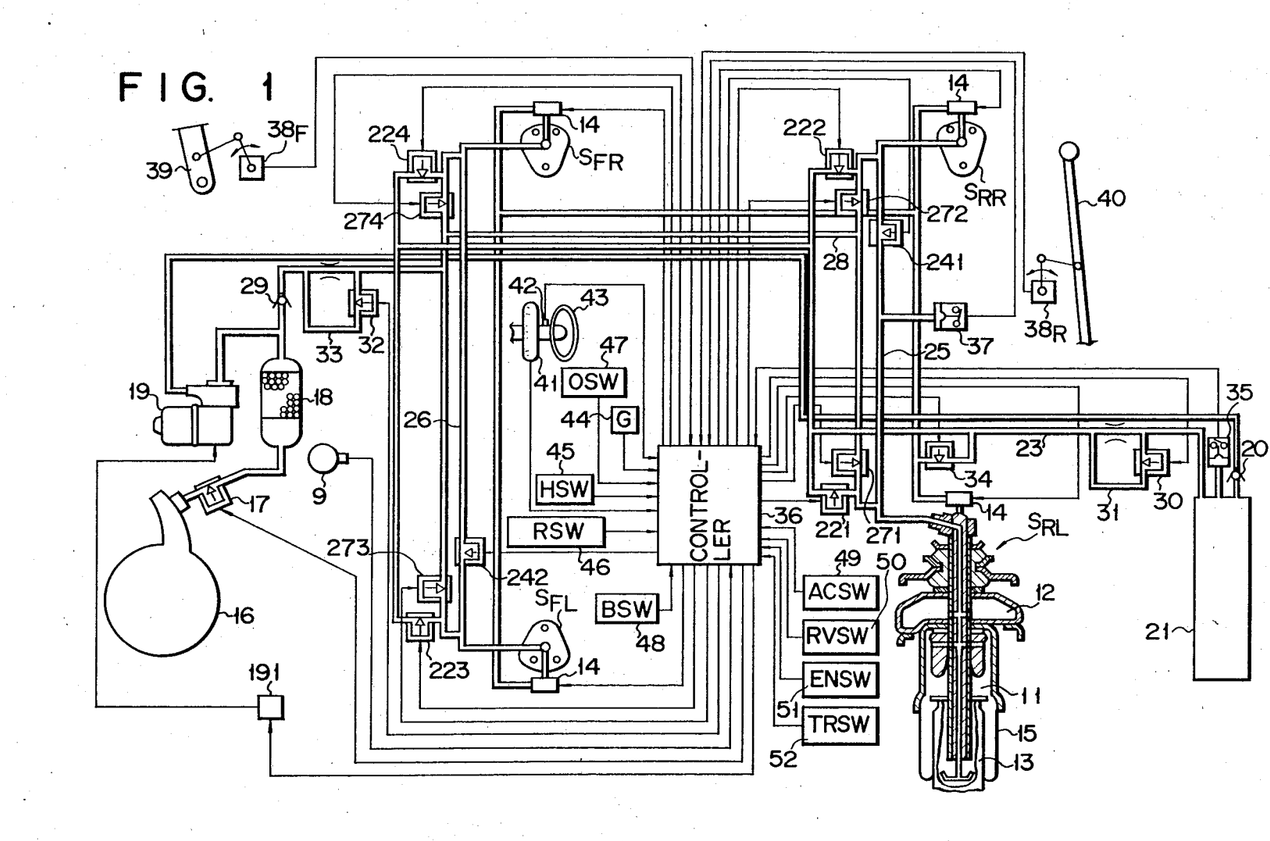
FIG. 1 is a schematic representation of a vehicle suspension apparatus according to the invention.

FIG. 1 shows an embodiment of the vehicle suspension apparatus according to the invention. The apparatus comprises a right front wheel suspension unit $S_{FR}$, a left front wheel suspension unit $S_{FL}$, a right rear wheel suspension unit $S_{RR}$ and a left rear wheel suspension unit $S_{RL}$. These suspension units $S_{FR}$, $S_{FL}$, $S_{RR}$ and $S_{RL}$ have an identical construction, so only the suspension unit $S_{RL}$ will be described in detail. The suspension unit $S_{RL}$ includes a main air spring chamber 11, an auxiliary air spring chamber 12, a shock absorber 13 and a coil spring (now shown) used as an auxiliary spring. The shock absorber 13 provides an attenuating force, which is switched between hard and soft by a pneumatic switch unit 14. The unit further includes a bellows 15 which defines the main air spring chamber 11. The switching of the air spring between hard and soft is effected by the switch unit 14 through control of bringing about and blocking communication between the main and auxiliary air spring chambers 11 and 12. The switch units 14 are all controlled by a controller 36 including a microcomputer.

Reference numeral 16 designates an air cleaner, and 17 a solenoid valve for blocking external air. Air from the air cleaner 16 is supplied through the solenoid valve 17 to a drier 18. Dry air from the drier 18 is supplied to a compressor 19, and compressed air therefrom is supplied through a check valve 20 to and stored in a reservoir tank 21. The compressor 19 is furnished with drive power from a generator which is driven from an engine (not shown). A relay 191 for the compressor 19 is controlled by the controller 36.

The reservoir tank 21 is connected to the main and auxiliary air spring chambers 11 and 12 of the individual suspension units $S_{FR}$, $S_{FL}$, $S_{RR}$ and $S_{RL}$ via an air supply duct line 23, on which respective air supply solenoid valves 221 to 224 are mounted. The main and auxiliary air spring chambers 11 and 12 of the suspension units $S_{RL}$ and $S_{RR}$ are communicated with one another via a communicating line 25, on which a communicating solenoid valve 241 is mounted. The main and auxiliary air spring chambers 11 and 12 of the suspension units $S_{FL}$ and $S_{FR}$ are communicated with one another via a communicating line 26, on which a communicating solenoid valve 242 is mounted. Compressed air in the main and auxiliary air spring chambers 11 and 12 of the individual suspension units $S_{FR}$, $S_{FL}$, $S_{RR}$ and $S_{RL}$ is discharged through an exhaust duct line 28, on which respective discharge solenoid valves 271 to 274 are mounted, check valve 29, drier 18, solenoid valve 17 and air cleaner 16.

A line 31 is provided in parallel with the air supply line 23, and an air supply flow path selection solenoid valve 30 is mounted on the line 31. A line 33 is provided in parallel with the exhaust line 28, and an exhaust flow path selection solenoid valve 32 is mounted on the line 33. A hard/soft switching solenoid valve 34 is provided between the air supply line 23 and switch unit 14, and it is on-off controlled by a signal from the controller 36.

The solenoid valves 17, 221 to 224, 271 to 274, 30 and 34 are normally closed valves, and solenoid valves 241 and 242 are normally open valves.

A pressure sensor 35 detects the pressure in the reservoir tank 21, and a detection signal from the pressure sensor 35 is fed to the controller 36. A pressure sensor 37 senses the pressure in the main and auxiliary chambers of the rear wheel suspension units $S_{RL}$ and $S_{RR}$, and a detection signal from the pressure sensor 37 is fed to the controller 36.

A vehicle height sensor 38F, which is mounted between a front right lower arm of the suspension and a vehicle body of the vehicle, senses the height of a front portion of the vehicle. A vehicle height sensor 38R, which is mounted between a rear left lateral rod 40 of the suspension and vehicle body of the vehicle, senses the height of a rear portion of the vehicle. Vehicle height detection signals from the vehicle height sensors 38F and 38R are fed to the controller 36. The vehicle height sensors 38F and 38R each consist of a hole IC element and a magnet, one of these being mounted on the wheel side and the other being mounted on the vehicle body side, and detect a distance from a normal height level, a high height level or a low height level of the vehicle. A vehicle speed sensor 41 senses the vehicle speed, and a steering state sensor 42 senses the steering angle of a steering wheel 43. Detection signals from these sensors 41 and 42 are fed to the controller 36. An acceleration sensor 44 senses acceleration exerted to the vehicle body in the forward and rearward directions, leftward and rightward directions and upward and downward directions. This sensor may use a weight and a light-blocking member interlocked thereto. In the absence of any exerted acceleration, the weight is in its normal, downwardly directed state, and the interlocked light-blocking member is blocking light from a light-emitting diode so that no light is incident on a photodiode. Absence of acceleration is thus detected. When the weight is inclined or moved, it is detected that an acceleration is exerted to the vehicle body.

A vehicle height selection switch (HSW) 45 can select a high vehicle height (HIGH), a low vehicle height (LOW) and an automatic vehicle height control mode (AUTO). A rolling control selection switch (RSW) 46 can select a control mode for reducing rolling of the vehicle. Signals of these switches 45 and 46 are fed to the controller 36. An oil pressure sensor (OSW) 47 senses the pressure P of engine lubrication oil. A brake sensor (BSW) 48 senses the extent of brake pedal depression. An acceleration aperture sensor 49 senses the engine acceleration aperture. An engine revolving rate sensor (RVSW) 50 senses the revolving rate N of the engine. An engine switch (ENSW) 51 is an ignition switch or the like for starting the engine. A transmission stage sensor (TRSW) 52 senses a speed change stage of the transmission. Output signals of the switches 45, 46 and 51 and sensors 47 to 50 and 52 are fed to the controller 36.

The controller 36 controls the vehicle height by comparing the vehicle height detected by the vehicle height sensors 38F and 38R to a desired vehicle height set by the vehicle height selection switch 45 and controlling the individual control valves such as to let the vehicle height coincide with the desired vehicle height.

The controller 36 further has a vehicle position or rolling control function of controlling the individual solenoid valves such as to cancel changes in the vehicle position, the vehicle position change and direction thereof being sensed by respective sensors.

When the vehicle height control noted above is done, the vehicle height is changed slowly by closing the air supply flow path selection solenoid valve 30 and exchaust flow path selection solenoid valve 32, thereby reducing the passenger's uncomfortability at the time of the vehicle height control. When the position or rolling control note above is done, the air supply flow path selection solenoid valve 30 and exhaust flow path selection solenoid valve 32 are opened, whereby it is possible to sufficiently cope with even a sudden position change.

Now, specific control of the embodiment of the vehicle suspension apparatus having the above construction according to the invention will be described.

The flow chart of FIGS. 2A to 2D show a routine of the controller 36 that is executed when the engine switch, i.e., ignition switch 51, is turned on.

First, in a step S1 vehicle speed data V detected by the vehicle speed sensor 41 is read into the controller 36. The routine then proceeds to a step S2, in which data representing the steering angle $\theta H$ detected by the steering state sensor 42 is fed to the controller 36. At this time, data about which side the steering angle is on of the center position, is fed. Further, the angular velocity corresponding to the steering angle $\theta H$, i.e., steering angular velocity $\dot{\theta}H$, is calculated from the steering angle $\theta H$, and also the direction of the steering angular velocity is determined. In a subsequent step S3, a check is done as to whether the absolute value $|\theta H|$ of the steering angle $\theta H$ is less than a preset angle $\theta O$, i.e., whether the steering angle is near the center position. The preset angle $\theta O$ is, for instance, 20 degrees. If the decision of the check in the step S3 is "YES", a step S4 is executed, in which a check is done as to whether the solenoid valves 241 and 242 are closed. If the decision of the check in the step S4 is "YES", a step S5 is executed, in which the solenoid valves 241 and 242 are opened. It is to be noted that the solenoid valves 241 and 242 are held open while the absolute value of the steering angle $\theta H$ is within the preset angle $\theta O$, i.e., in an insensitive range, and in this state the air spring chambers of the left and right suspension units are communicated with one another so that rolling control of the vehicle is not done.

Figure 2A:
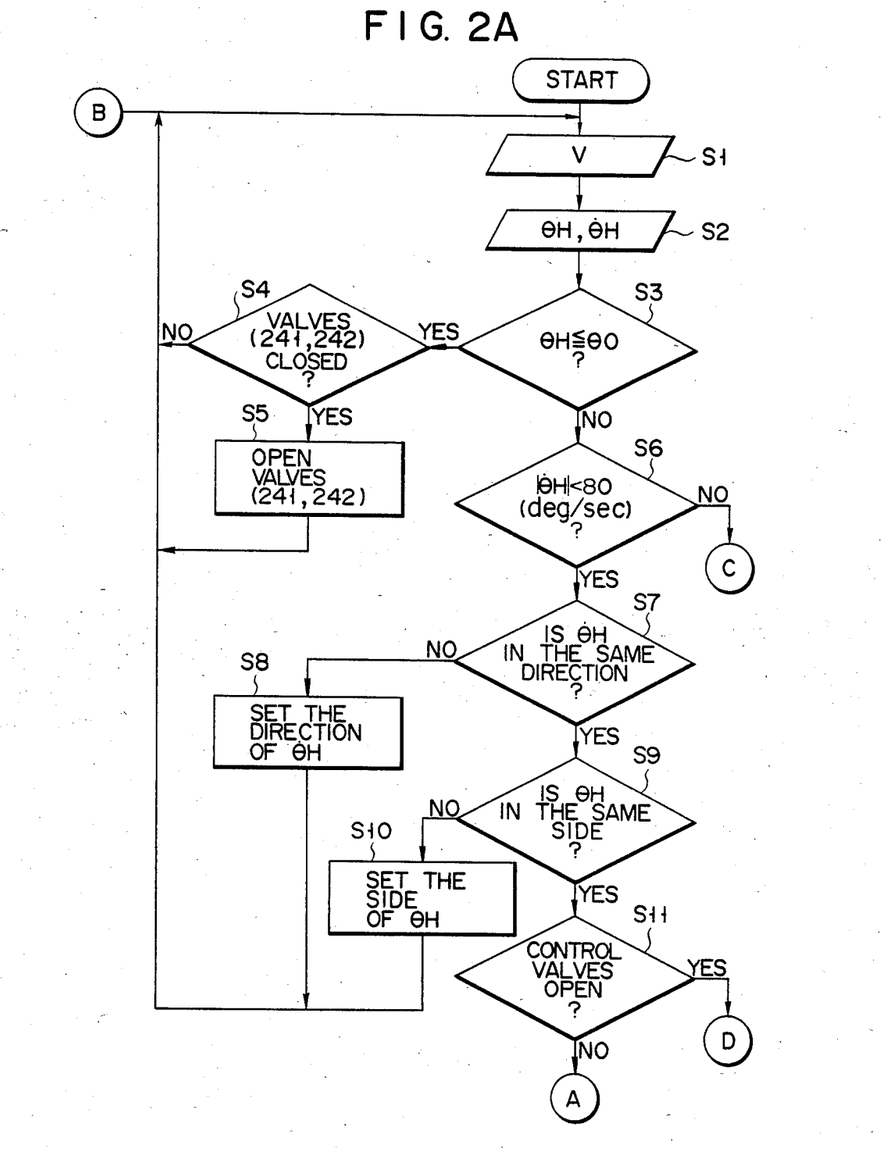
FIGS. 2A to 2D are flow charts showing an example of control by the apparatus.
Figures 2B, 2C:
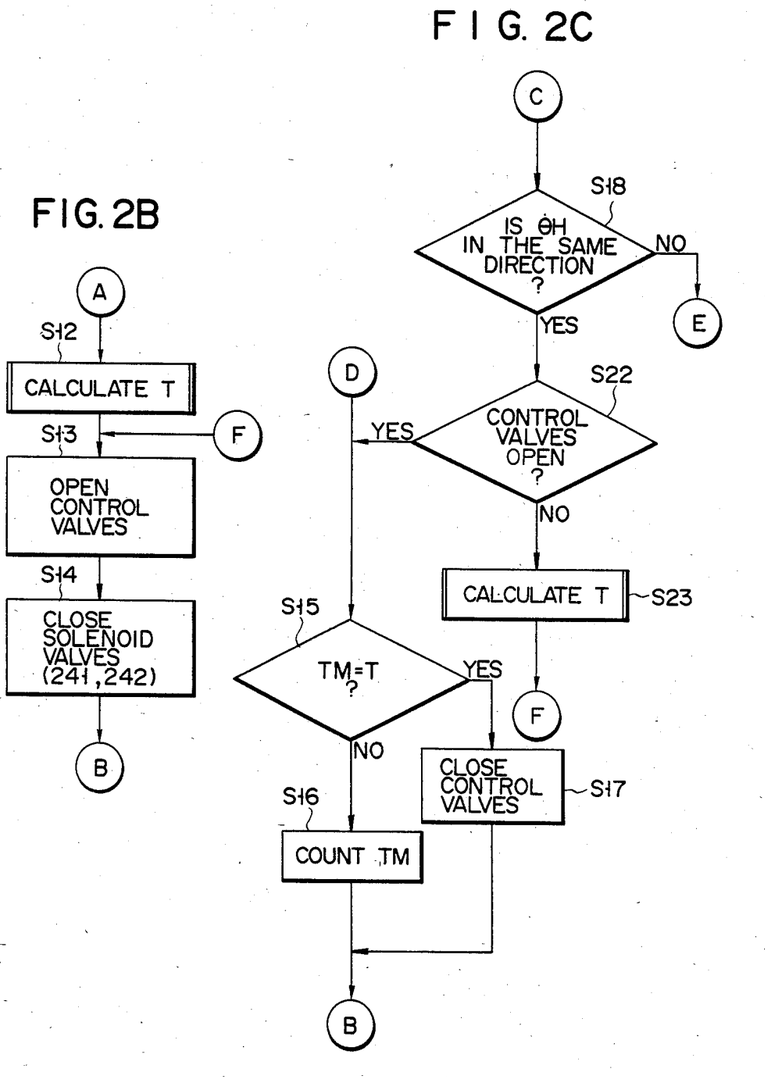
Figure 2D:
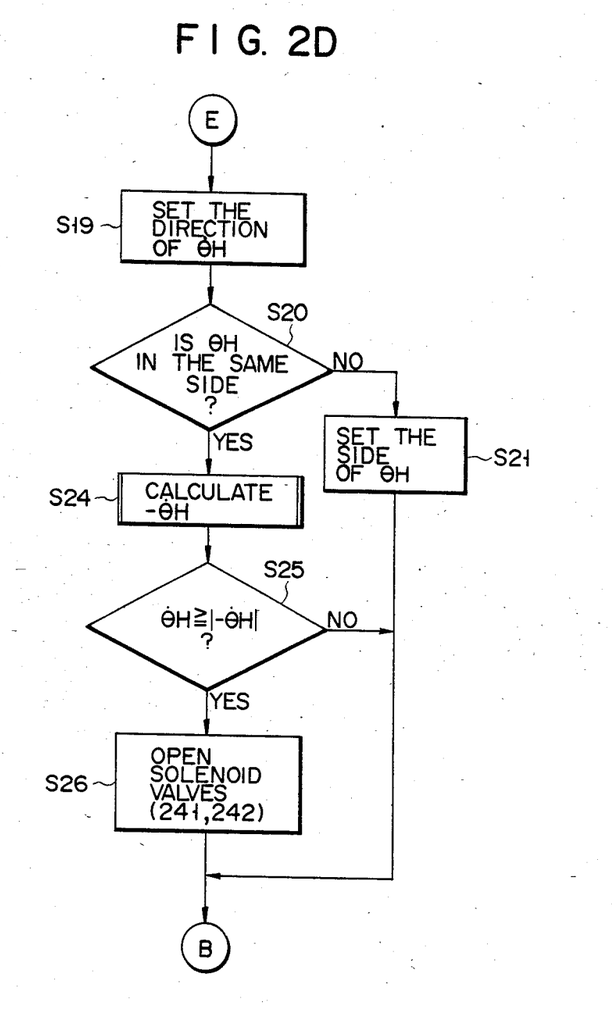
Figure 3:
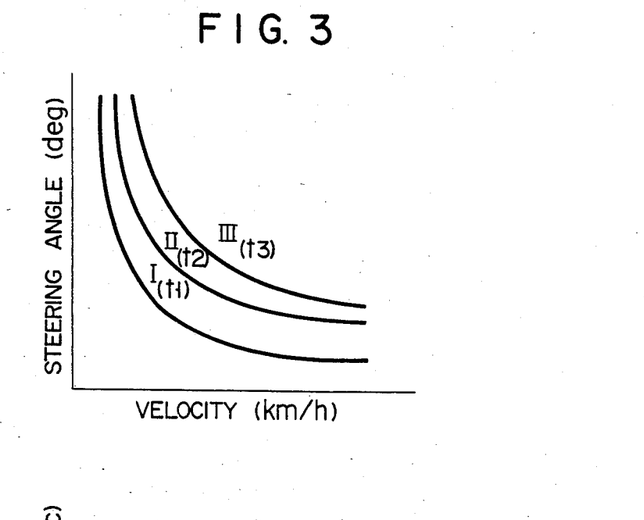
FIG. 3 is a graph showing an example of steering angle versus vehicle velocity characteristics.

If the decision of the check is the step S3 is "NO", a step S6 is executed, in which a check is done as to whether the absolute value of the steering angular velocity $\dot{\theta}H$ is less than a preset angular velocity $\dot{\theta}O$ (e.g., 80 deg/sec). If the decision of the check in the step S6 is "YES", a step S7 is executed, in which a check is done as to whether the steering angular velocity $\dot{\theta}H$ is in the same direction. The step S7 this time yields a decision "NO" because there is initially no direction to be compared with. The routine thus proceeds to a step S8, in which the direction of the steering angular velocity $\dot{\theta}$H is stored in a predetermined memory area in the controller 36. In other words, even if the steering angle $\theta$H is greater than the preset angle $\theta$O, the direction of the steering angular velocity $\dot{\theta}$H is stored in the memory in the step S8 so long as the steering angular velocity $\dot{\theta}$H at this time is less than the preset value $\dot{\theta}$O. The routine then goes back to the step S1 and thence through the steps S2, S3, S6 and S7. This time, a check is done in the step S7 as to whether the direction of the steering angular velocity $\dot{\theta}$H is the same as that stored in the step S8 of the preceding sequence. For example, if the steering wheel 43 continues to be in a state being operated in the same direction, the steering angular velocity $\dot{\theta}$H has the same direction, so that a decision "YES" is yielded, causing the routine to proceed to a step S9. In the step S9, a check is done as to whether the steering angle $\theta$H has the same side. The step S9 initially yields a decision "NO" because there is no side to be compared with, so that the routine proceeds to a step S10. In the step S10, the side (either rightward or leftward) of the steering angle $\theta$H is stored in a predetermined memory area in the controller 36. The routine then goes back to the step S1 and thence through the steps S2, S3, S6, S7 and S9. This time, a check is done in the step S9 as to whether the steering angular $\theta$H is in the same side as that stored in the step S10 in the preceding sequence. For example, if the steering wheel 43 continues to be in a state being operated in the same direction, the steering angle $\theta$H has the same side, so that a decision "YES" is yielded in the step S9, causing the routine to proceed to a step S11. In the step S11, a check is done as to whether the control valves, i.e., solenoid valves 221 to 224 and 271 to 274, are open. Since these valves 221 to 224 and 271 to 274 are normally closed valves, the decision of the check is "NO", so that the routine proceeds to a step S12. In the step S12, the period of time, during which the control valves, i.e., solenoid valves 221 to 224 and 271 to 274, are held open, i.e., extent of control, is obtained from a steering angle $\theta$H versus vehicle velocity V characteristic as shown in FIG. 3. FIG. 3 shows three steering angle versus vehicle velocity characteristics I to III according to the magnitude of lateral acceleration applied to the vehicle body, which is obtained from the steering angle $\theta$H and vehicle velocity V. Control times t1 to t3 are set for the respective characteristics I to III. In a subsequent step S13 pertinent control valves are opened, and then in a step S14 the solenoid valves 241 and 242 are closed to start the rolling control. More specifically, if the steering wheel is being operated to the left (i.e., in the counterclockwise direction), the height of the right side of the vehicle body decreases while that of the left side of the vehicle body increases so that the vehicle body tends to roll to the right. Accordingly, after the closure of the solenoid valves 241 and 242, the air supply solenoid valves 222 and 224 of the right side suspension units and exhaust solenoid valves 271 and 273 of the left side suspension units are opened, thus supplying compressed air to the right side suspension units while exhausting air from the left side suspension units to reduce the rolling and maintain the vehicle body horizontal. The routine then goes back to the step S1 and thence through the steps S2, S3, S6, S7, S9 and S11. This time, the step S11 yields a decision "YES" for the pertinent control valves are open, so that the routine proceeds to a step S15. In the step S15, a check is done as to whether the control extent obtained in the step S12 has been reached by the time TM of the open state of the control valves. If the control extent has not been reached yet, the routine proceeds to a step S16 of upcounting the control extent. Thereafter, the steps S1, S2, S3, S6, S7, S9, S11, S15 and S16 are repeatedly executed until the control extent is reached by the time of the open state of the control valves. When the control extent is reached by the time of the open state of the control valves, a decision "YES" is yielded in the step S15, so that the routine goes to a step S17. In the step S17, the control valves, i.e., the air supply solenoid valves 222 and 224 and exhaust solenoid valves 271 and 273, are closed, In this way, control is performed according to lateral acceleration that would be applied to the vehicle body.

When the steering wheel 43 is subsequently returned to the center position, the routine goes through the steps S3 and S4 to the step S5 of opening the solenoid valves 241 and 242, thus making the pressures in the air spring chamber of the left and right side suspension units the same as in the normal running of the vehicle along a straight line.

The rolling control as described above takes place when the steering angular velocity of operation of the steering wheel 43 is $|\dot{\theta}H|<80$ deg/sec.

Now, rolling control will be described in connection with a case when the steering angular velocity is $|\dot{\theta}H| \geq 80$ deg/sec.

Figure 4:
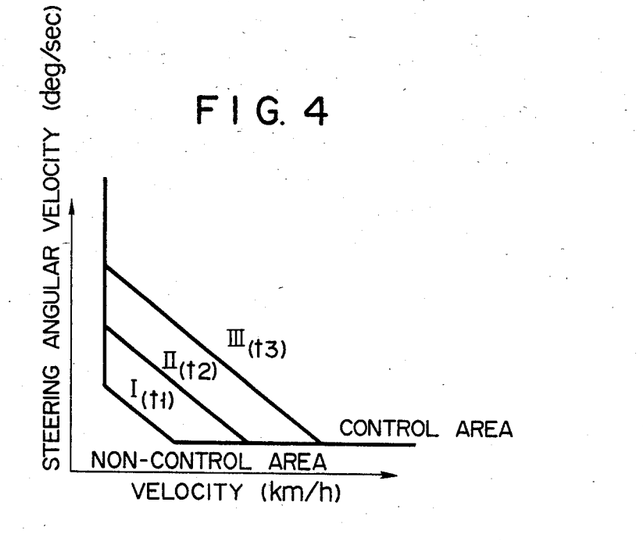
FIG. 4 is a graph showing an example of steering angular velocity versus vehicle velocity characteristics.

In this case, a decision "NO" is yielded in the step S6, so that the routine goes to a step S18. It is assumed now that the steering wheel 43 has been operated to the left and is found at a position corresponding to a point labeled a in FIG. 5. In the step S18, a check is done as to whether the direction of the steering angle velocity $\dot{\theta}$H is the same as before. Since there is no direction set before, the step S18 yields a decision "NO", so that the routine goes to a step S19. In the step S19, the direction of the steering angular velocity $\dot{\theta}$H is set in a predetermined memory area in the controller 36. In a subsequent step S20, a check is done as to whether the steering angle $\dot{\theta}$H is in the same side as before. Since no side to be compared with has been set yet, the step yields a decision "NO", so that the routine proceeds to a step S21. In the step S21, the side (i.e., leftward sense) of the steering angle $\dot{\theta}$H is set. The routine then goes back to the step S1 and thence through the steps S1, S2, S3, S6 and S18. This time, it is decided in the step S18 that the direction of the steering angular velocity is the same as before to yield a decision "YES". The routine thus proceeds to a step S22, in which a check is done as to whether the control valves, i.e., air supply solenoid valves 221 to 224 and exhaust solenoid valves 271 to 274, are open. Since the solenoid valves 221 to 224 and 271 to 274 are normally closed valves, the decision of the check is initially "NO", and the routine proceeds to a step S23. In the step S23, the period of time, during which the solenoid valves 221 to 224 and 271 to 274, are to be held open, i.e., control extent, is obtained from a steering angular velocity $\dot{\theta}$H versus vehicle velocity V characteristic shown in FIG. 4. FIG. 4 shows three steering angular velocity versus vehicle speed characteristics I to III according to lateral acceleration applied to the vehicle body, which is determined by the steering angular velocity and vehicle velocity. Control times t1 to t3 are set for the respective characteristics I to III.

Figure 5A:
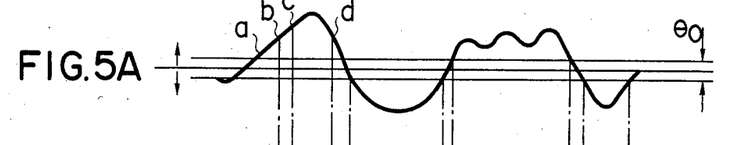
FIGS. 5A to 5C are timing charts for explaining the control.
Figure 5B:
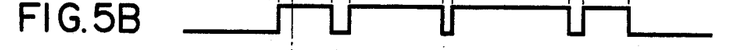
Figure 5C:
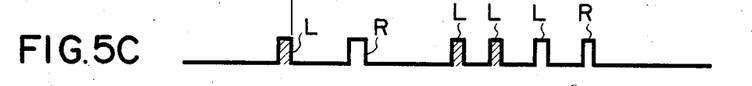
Figure 6:
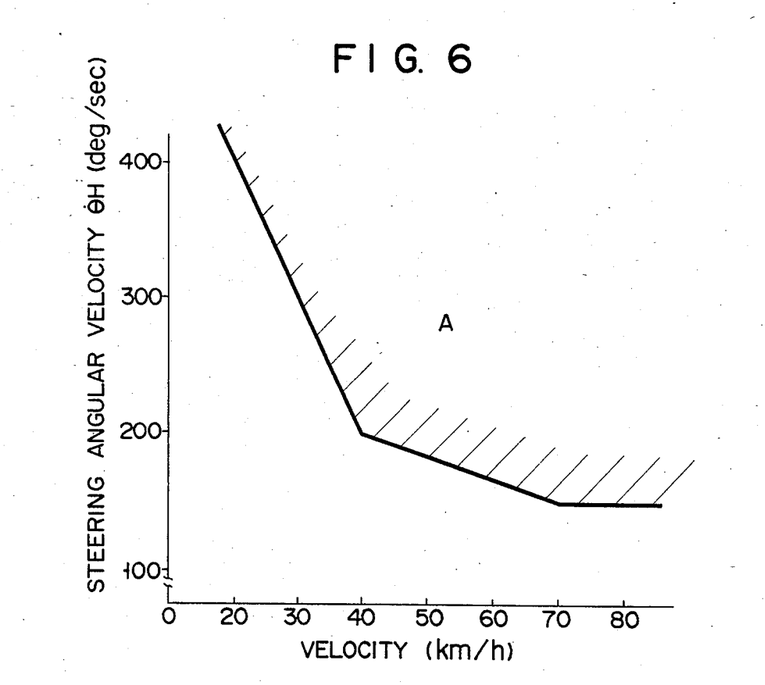
FIG. 6 is a graph showing a steering angular velocity versus vehicle velocity characteristic.

The routine then goes through the steps S13 and S14 for rolling control (corresponding to point b in FIG. 5A). Subsequently, the steps S1, S2, S3, S6, S18, S22, S15 and S16 are executed repeatedly until a decision "YES" is yielded in the step S15. When a decision "YES" is yielded in the step S15, the control valves are closed (corresponding to point c in FIG. 5A). In the above way, vehicle rolling control in case when the steering angular velocity is $\dot{\theta}H \geq 80$ deg/sec. is performed. Subsequently, the routine goes back to the step S1 and thence through the steps S2, S3 and S6. When the steering wheel is operated toward the center position at the time of slalom running, a decision "NO" is yielded in the step S18, and the routine goes through the step S19 to the step S20, in which the check is done as to whether the side of the steering angle $\theta H$ is the same as that set before in the step S21 in the preceding sequence. If the decision of the check in the step S20 is "YES", the routine goes to a step S24, in which the return steering angular velocity $-\dot{\theta}H$ is obtained from the return steering angular velocity $\dot{\theta}H$ versus vehicle velocity V characteristic shown in FIG. 4. In a subsequent step S25, a check is done as to whether the detected steering angular velocity $\dot{\theta}H$ is greater than $|-\dot{\theta}H|$. Since $\dot{\theta}H > |-\dot{\theta}H|$ in the area A shown in FIG. 4, the routine proceeds to a step S26, in which the solenoid valves 241 and 242 are opened (corresponding to point d in FIG. 5A), thus releasing the rolling control. In FIG. 5C, reference symbol L designates control at the time of leftward turning, and symbol R control at the time of rightward turning.

It is to be noted that when quickly returning the steering wheel 43 to the center position at the time of the slalom running the solenoid valves 241 and 242 are opened before the reaching of the center position, i.e., before the steering angle reaches the insensitive range. This has an effect of preventing a displacement tending to return the vehicle body to the horizontal position, so that it is possible to improve the stability of vehicle position without causing a delay in the return of the vehicle attitude even at the time of a high speed slalom running, at which time the steering wheel is repeatedly quickly operated.

It is to be understood that any suitable step may be added to the routine shown in FIGS. 2A to 2D. For example, a step of checking whether the vehicle velocity is a preset velocity (e.g., 20 km/h) may be provided between the steps S2 and S3 so that the routine goes to the step S6 if the vehicle velocity is above the preset velocity while going to the step S4 if the vehicle velocity is below the preset velocity. In this case, even when the steering wheel is operated during running so that rolling control is started through the steps S12 through S17 and the vehicle is stopped in this state, the control can be reliably restored through the additional step.

Further, it will be obvious that the same effects can be obtained when the invention is applied to a vehicle suspension apparatus of hydropneumatic type.

What is claimed is:

1. A vehicle suspension apparatus comprising suspension units each provided for each wheel and having a fluid spring chamber, fluid supply means for supplying fluid to said fluid spring chambers of said suspension units through a fluid supply control on-off valve, fluid exhausting means for exhausting fluid from said fluid spring chambers of said suspension units through an exhaust control on-off valve, and communicating means for communicating the fluid spring chambers of the front left and right suspension units with one another and communicating the fluid spring chambers of the rear left and right suspension units with one another through respective communication control valves, said communication control valves of said communicating means being normally held open to communicate the fluid spring chambers of the front left and right suspension units with one another and communicate the fluid spring chambers of the rear left and right suspension units with one another, a rolling displacement of the vehicle body being suppressed with said communication control valves of said communicating means closed and with fluid supplied to contraction side fluid spring chambers and exhausted from elongation side fluid spring chambers with respect to the direction of rolling of the vehicle body, said vehicle suspension apparatus further comprising:
steering state detecting means for detecting the steering state of the vehicle;
vehicle velocity sensing means for sensing the vehicle velocity;
rolling suppression starting means functioning, when it is decided from the steering angular velocity detected by said steering state detecting means and the vehicle velocity detected by said vehicle velocity sensing means that it is necessary to start a rolling control, to close said communication control valves of said communicating means and also effect on-off control of said communication control valves, fluid supply control on-off valve and exhaust control on-off valves such as to supply fluid to the contraction side fluid spring chambers and exhaust fluid from the elongation side fluid spring chambers with respect to the direction of rolling of the vehicle body; and
rolling control restoring means for opening said communication control valves when it is decided by said steering state detecting means that the steering is being executed in a returning direction toward a center position after the start of the rolling control caused by said rolling suppression starting means and also it is decided from the steering angular velocity detected by said steering state detecting means and the vehicle velocity detected by said vehicle velocity sensing means that said vehicle body begins returning to a neutral state.

2. The vehicle suspension apparatus according to claim 1, wherein said rolling suppression starting means closes said communication control valves when the steering angle detected by said steering state detecting means is within a preset range.

3. The vehicle suspension apparatus according to claim 1, wherein said rolling suppression starting means includes:
first comparing means for memorizing the direction of the steering angular velocity detected by said steering state detecting means for every unit time and comparing the detected direction of the steering angular velocity and memorized direction of the steering angular velocity; and
second comparing means for memorizing the side of the steering angle detected by said steering state detecting means for every unit time and comparing the detected side of the steering angle and memorized side of the steering angle;
it being decided that the steering is being executed in a returning direction toward a center position when it is determined by said first comparing means that the detected direction of the steering angular velocity is not the same as the previously memorized direction of the steering angular velocity and also it is determined by said second comparing means that the detected side of the steering angle is the same as the previously memorized side of the steering angle.

4. The vehicle suspension apparatus according to claim 1, wherein said rolling suppression starting means includes:
rolling control extent determining means for determining a necessary rolling control extent according to the steering angular velocity detected by said steering state detecting means and vehicle velocity detected by said vehicle velocity sensing means;
a period of time of the open state of said fluid supply and exhaust control on-off valves being determined according to the rolling control extent determined by said rolling control extent determining means.

5. The vehicle suspension apparatus according to claim 4, wherein said rolling suppression starting means includes:
first comparing means for memorizing the direction of the steering angular velocity detected by said steering state detecting means for every unit time and comparing the detected direction of the steering angular velocity and memorized direction of the steering angular velocity; and
second comparing means for memorizing the side of the steering angle detected by said steering state detecting means for every unit time and comparing the detected side of the steering angle and memorized side of the steering angle;
the necessary rolling control extent being determined by said rolling control extent determining means when it is determined by said first comparing means that the detected direction of the steering angular velocity is the same as the previously memorized direction of the steering angular velocity and also it is determined by said second comparing means that the detected side of the steering angle is the same as the previously memorized side of the steering angle.

6. A vehicle suspension apparatus comprising suspension units each provided for each wheel and having an air spring chamber, air supply means for supplying compressed air to said air spring chambers of said suspension units through an air supply control on-off valve, exhausting means for exhausting compressed air from said air spring chambers of said suspension units through an exhaust control on-off valve, and communicating means for communicating the air spring chambers of the front left and right suspension units with one another and communicating the air spring chambers of the rear left and right suspension units to one another through respective communication control valves, said communication control valves of said communicating means being normally held open to communicate the air spring chambers of the front left and right suspension units with one another and communicate the air spring chambers of the rear left and right suspension units with one another, a rolling displacement of the vehicle body being suppressed with said communication control valves of said communicating means closed and with compressed air supplied to contraction side air spring chambers and exhausted from elongation side air spring chambers with respect to the direction of rolling of the vehicle body, said vehicle suspension apparatus further comprising:
steering state detecting means for detecting the steering state of the vehicle;
vehicle velocity sensing means for sensing the vehicle velocity;
rolling suspension starting means functioning, when it is decided from the steering angular velocity detected by said steering state detecting means and the vehicle velocity detected by said vehicle velocity sensing means that it is necessary to start a rolling control, to close said communication control valves of said communicating means and also effect on-off control of said communication control valves, air supply control on-off valve and exhaust control on-off valve such as to supply compressed air to the contraction side fluid spring chambers and exhaust compressed air from the elongation side air spring chambers with respect to the direction of rolling of the vehicle body; and
rolling control restoring means for opening said communication control valves when it is decided by said steering state detecting means that the steering is being executed in a returning direction toward a center position after the start of the rolling control caused by said rolling suppression starting means and also it is decided from the steering angular velocity detected by said steering state detecting means and the vehicle velocity detected by said vehicle velocity sensing means that the vehicle body has begun to return to a neutral state.

* * * * *

UNITED STATES PATENT AND TRADEMARK OFFICE
CERTIFICATE OF CORRECTION

PATENT NO. : 4,605,244

DATED : August 12, 1986

INVENTOR(S) : T. TANAKA et al

It is certified that error appears in the above-identified patent and that said Letters Patent is hereby corrected as shown below:

On the title page

Under the heading "Foreign Application Priority Data":

"59-63111" should read -- 59-63111(U) --;

The following application should also be added as follows:

--Apr. 8, 1985 [JP] Japan ............. 60-74018--.

Signed and Sealed this

Twentieth Day of January, 1987

Attest:

DONALD J. QUIGG

Attesting Officer

Commissioner of Patents and Trademarks